(12) United States Patent
Hughes (10) Patent No.: US 9,199,804 B2
(45) Date of Patent: Dec. 1, 2015

(54) AIR LOCK METERING

(71) Applicant: Dale Hughes, Swift Current (CA)

(72) Inventor: Dale Hughes, Swift Current (CA)

( * ) Notice: Subject to any disclaimer, the term of this patent is extended or adjusted under 35 U.S.C. 154(b) by 148 days.

(21) Appl. No.: 14/101,858

(22) Filed: Dec. 10, 2013

(65) Prior Publication Data

US 2014/0166439 A1   Jun. 19, 2014

(51) Int. Cl.
*B65G 53/46* (2006.01)
*G01F 11/24* (2006.01)

(52) U.S. Cl.
CPC ............ *B65G 53/4633* (2013.01); *G01F 11/24* (2013.01)

(58) Field of Classification Search
USPC ............... 406/64, 66, 67, 123, 128, 144, 181; 111/174; 222/367, 636
See application file for complete search history.

(56) References Cited

U.S. PATENT DOCUMENTS

| | | | | | |
|---|---|---|---|---|---|
| 1,494,669 | A * | 5/1924 | Maurice | ............. | B65G 53/4616 406/66 |
| 3,574,411 | A * | 4/1971 | Miller | ................ | B65G 53/4633 222/365 |
| 3,669,308 | A * | 6/1972 | Werner | ................ | B65G 11/063 198/560 |
| 4,084,676 | A * | 4/1978 | Motyka | ................... | G07F 13/00 194/297 |
| 4,453,866 | A * | 6/1984 | Ryan | ....................... | B65G 53/40 111/34 |
| 4,465,239 | A * | 8/1984 | Woten | .................... | B65G 53/46 241/159 |
| 4,560,307 | A * | 12/1985 | Deitesfeld | .......... | B65G 53/4633 222/236 |
| 4,599,015 | A * | 7/1986 | Krambrock | ........ | B65G 53/4616 222/148 |
| 4,695,207 | A * | 9/1987 | Miller | .................... | B65D 90/66 105/299 |
| 4,710,067 | A * | 12/1987 | Salley | ................. | B65G 53/4633 406/64 |
| 4,747,524 | A * | 5/1988 | Krambrock | ........ | B65G 53/4616 222/345 |
| 4,793,743 | A * | 12/1988 | Grodecki | ............... | A01C 7/081 406/123 |
| 5,324,143 | A * | 6/1994 | Sanders | ............. | B65G 53/4633 406/67 |
| 5,409,034 | A * | 4/1995 | Ostertag | ................... | E03C 1/05 137/499 |
| 5,480,268 | A * | 1/1996 | Smoot | ................ | B65G 53/4633 222/368 |
| 5,494,381 | A * | 2/1996 | Heyl | ....................... | B65G 53/66 406/14 |
| 5,592,889 | A * | 1/1997 | Bourgault | ............ | A01C 15/006 111/174 |
| 5,752,788 | A * | 5/1998 | Crum | .................... | B05B 7/1422 406/109 |
| 5,765,728 | A * | 6/1998 | Simpson | ................. | B01J 8/002 222/146.2 |
| 5,813,801 | A * | 9/1998 | Newbolt | ................ | B65G 53/66 406/14 |
| 5,829,649 | A * | 11/1998 | Horton | .................... | B02C 13/10 222/238 |
| 6,206,247 | B1 * | 3/2001 | Ingram | .............. | B65G 53/4633 222/368 |
| 6,471,447 | B1 * | 10/2002 | Salley | ................ | B65G 53/4633 406/64 |
| 6,966,466 | B2 * | 11/2005 | Jensen | ............... | B65G 53/4633 222/368 |
| 7,094,004 | B2 * | 8/2006 | Dunlop | ..................... | B60P 1/00 406/145 |
| 7,237,699 | B2 * | 7/2007 | Zill | ........................... | B65B 1/16 222/189.06 |
| 9,010,811 | B2 * | 4/2015 | Gramling | ............. | B65D 90/623 16/334 |
| 2002/0146289 | A1 * | 10/2002 | Salley | ................ | B65G 53/4633 406/64 |
| 2005/0269369 | A1 * | 12/2005 | Pfeiffer | .................... | G01F 11/24 222/367 |
| 2014/0158033 | A1 * | 6/2014 | Jagow | ..................... | A01C 7/082 111/174 |
| 2014/0216315 | A1 * | 8/2014 | Beaujot | ..................... | A01C 7/06 111/174 |
| 2015/0044014 | A1 * | 2/2015 | Vimalchand | ............... | C10J 3/30 414/805 |

* cited by examiner

*Primary Examiner* — Joseph Dillon, Jr
(74) *Attorney, Agent, or Firm* — Olive Law Group, PLLC (57) ABSTRACT

A metering device for metering granular product into a pressurized conduit of a pneumatic conveyor has a tubular housing oriented vertically. Intake and discharge openings are defined in opposite housing walls with blank walls between the openings. Upper and lower hubs are rotatably mounted and sealed in ends of the housing above and below the intake and discharge openings. An upper surface of the lower hub slopes downward toward an outer edge thereof. The upper and lower hubs are fastened to a drive shaft extending along the housing axis and a meter drive rotates the drive shaft at a selected rotational speed. Each of a plurality of flexible blades extends between the upper and lower hubs and has an outer edge wiping the inner wall surface of the housing such that a sealed blade chamber is formed between adjacent blades and one of the blank walls as the hubs rotate.

24 Claims, 6 Drawing Sheets

AIR LOCK METERING

CROSS-REFERENCE TO RELATED APPLICATION

This application claims the benefit of Canada Patent Application Serial No. 2,799,235, titled AIR LOCK METERING and filed Dec. 19, 2012, the content of which is hereby incorporated herein by reference in its entirety.

FIELD OF THE INVENTION

This invention is in the field of metering equipment and in particular a metering system for dispensing granular products into a pressurized environment, such as the distribution network of an air seeder.

BACKGROUND

It is required in various industries to dispense granular product from a tank or container into pressurized environment, such as the transfer conduit of a pneumatic conveyor. For example in the agriculture industry, air seeders are well known for seeding crops and typically comprise a frame with furrow openers mounted thereon that are configured to create furrows in a field surface. Tanks mounted on a cart or on the frame contain agricultural products such as seeds, chemicals, and fertilizers and metering devices dispense agricultural products from each tank into a distribution network connected between the tanks and the furrow openers. A fan creates an air stream flowing through the distribution network to carry the agricultural products from the tanks to the furrow openers.

The distribution network commonly includes one or more larger primary conduits from the tanks to the frame, which are each connected to the input port of a manifold which receives the air stream and divides and directs the air stream, and the agricultural products entrained in the air stream, through output ports into a number of smaller secondary conduits. The secondary conduits carry the air stream and products downstream either to another manifold for further division, or to the furrow openers. In some distribution networks conduits are connected directly from the furrow openers to the metering devices, and no secondary division of the air stream is needed.

Most modern air seeders have furrow openers that deliver seed to seed furrows and fertilizer to separate fertilizer furrows. These may be totally separate furrow openers mounted on separate shanks, such as mid row fertilizer banding furrow openers which are remote from the seed furrow openers, or combination furrow opener where a single shank supports a furrow opening tool that makes one furrow for seed and a separate furrow for fertilizer. There are also commonly two separate distribution networks, one delivering product from selected ones of the tanks to the seed furrows, and one delivering product from selected ones of the tanks to the fertilizer furrows. In this application the terms "seed" and "fertilizer" are not meant literally or in a limiting fashion, since in many cases some fertilizer is metered into the air stream carrying the seed, and also in some instances it may be that fertilizer may be directed into the "seed" furrows, and vice versa if conditions warrant it. The terms "seed" and "fertilizer" are simply convenient to differentiate the two separate distribution networks or air streams. In an air seeder it is generally desirable to be able to direct agricultural product from any of the tanks into any of the available air streams.

One typical type of seed metering device includes a rotating feed roller with recesses that can be in the form of grooves extending longitudinally along the length of the outer surface of roller parallel to the axis of rotation, or in the form of notches or pockets or the like spaced evenly along the outer surface of the roller. The feed roller is typically mounted below the feed opening at the bottom of a product tank and configured such that the intake side of the roller is inside the feed opening exposed to the seeds in the tank and the outer output side is above the air stream that carries the seeds to the furrow openers to be deposited in the ground. As the roller rotates, granules of the agricultural product being dispensed fill the recesses and are carried from the seed tank and fed into the air stream.

Instead of a feed roller some metering devices use an auger with an input end under the tank and an output end oriented to dispense product into the air stream. Again the metering rate is proportional to the speed of auger rotation. The number of seeds dispensed is proportional to the rotational speed of the feed roller or auger, and the rate of metering seeds is adjusted by varying the rotational speed. The rotational speed is also coordinated with ground speed so that the same amount of seed is dispensed for each foot of distance travelled. Ground speed correlation can be achieved by using a ground drive, or as is common in modern air seeders, the ground speed is sensed and the meters are driven by motors where the speed is adjusted to correspond to the ground speed.

The size of the granules of the agricultural products metered varies significantly, and the application rate of the various products also varies significantly from as low as about three pounds per acre to 300 pounds per acre or more. While the metering devices can typically be adjusted to provide a significant range of metering rates for different sized products, when changing from a very high rate to a very low rate, or from a large to a small granule size, many metering devices require that the feed roller or auger be changed to provide a steady and even stream of product for uniform application across the field surface.

The intake side of the metering device is exposed to whatever the air pressure is inside the tank, while the output side is exposed to the increased air pressure of the air stream. A pressure differential across the metering device between the tank and the air stream can cause air to flow back through the meter from the higher pressure side to the lower pressure side as the product is being metered into the air stream, disrupting the flow. It has been known to seal the metering device to provide an air lock between the meter and the pressurized distribution tube however such air lock systems have been costly and problematic and present air seeders typically provide a conduit connecting the air stream at the output end of the metering device to the top of the interior of the tank to pressurize the tank so that there is no pressure differential across the metering. This requires that the tank be sealed during operation and designed to resist deformation due to forces exerted by the pressure. The resulting restricted tank shapes, and small fill openings are challenging for operators to use, such as when aligning the fill opening with a fill conveyor, and also restrict the volumes capable of being held in a defined space/foot print.

The gravity feed aspect of the metering devices also creates some compromises. The tanks and their mounting structures are required to be of sufficient height to allow metering devices and drives to function directly underneath. Any maintenance, metering component changes or associated operations require operators to crawl under the unit and work off the ground.

SUMMARY OF THE INVENTION

It is an object of the present invention to provide a metering system that is particularly suited for a pneumatic conveying system such as an air seeder, and that overcomes problems in the prior art.

In a first embodiment the present invention provides a metering device for metering granular product into a pressurized conduit of a pneumatic conveyor. The device comprises a tubular housing with a smooth inner wall surface, the housing oriented such that a housing axis thereof is oriented substantially vertically. An intake opening is defined in an intake wall of the housing, and a discharge opening is defined in a discharge wall of the housing opposite the intake wall, and first and second blank walls are between the intake and discharge openings. An upper hub is rotatably mounted in an upper end of the housing above the intake and discharge openings, and an upper seal seals a perimeter of the upper hub to the inner wall surface of the housing. A lower hub is rotatably mounted in a lower end of the housing below the intake and discharge openings, and a lower seal seals a perimeter of the lower hub to the inner wall surface of the housing. An upper surface of the lower hub slopes downward from in inner edge thereof adjacent to the housing axis to an outer edge thereof adjacent to the housing such that granular product flows down the sloped upper surface. A drive shaft extends along the housing axis through the upper and lower hubs and is fastened to the upper and lower hubs such that the hubs rotate with the drive shaft, and a meter drive is connected to rotate the drive shaft at a selected rotational speed. Each of a plurality of flexible blades extends between the upper and lower hubs and has an outer edge wiping the inner wall surface of the housing as the hubs rotate and an inner edge substantially sealed to the drive shaft such that a substantially sealed blade chamber is formed between adjacent blades and one of the blank walls as the hubs rotate.

In a second embodiment the present invention provides a metering system for metering agricultural granular product from a product tank into a plurality of pressurized distribution conduits of an air seeder. The system comprises, for each distribution conduit, a metering device comprising a tubular housing with a smooth inner wall surface, the housing oriented such that a housing axis thereof is oriented substantially vertically; an intake opening defined in an intake wall of the housing, and a discharge opening defined in a discharge wall of the housing opposite the intake wall, and first and second blank walls between the intake and discharge openings; a discharge chute sealed at an input end thereof to an outer surface of the housing around the discharge opening, and sealed at an output end thereof to a corresponding distribution conduit; an intake gate movable to block a selected upper portion of the intake opening such that only a lower portion of the intake opening below the gate is open and exposed to the granular product; an upper hub rotatably mounted in an upper end of the housing above the intake and discharge openings, and an upper seal sealing a perimeter of the upper hub to an inner wall surface of the housing; a lower hub rotatably mounted in a lower end of the housing below the intake and discharge openings, and a lower seal sealing a perimeter of the lower hub to the inner wall surface of the housing, wherein an upper surface of the lower hub slopes downward from in inner edge thereof adjacent to the housing axis to an outer edge thereof adjacent to the housing such that granular product flows down the sloped upper surface; a drive shaft extending downward along the housing axis through the upper and lower hubs and fastened to the upper and lower hubs such that the hubs rotate with the drive shaft; a meter drive connected to rotate the drive shaft at a selected rotational speed; a plurality of flexible blades, each blade extending between the upper and lower hubs and having an outer edge wiping the inner wall surface of the housing as the hubs rotate and an inner edge substantially sealed to the drive shaft such that a substantially sealed blade chamber is formed between adjacent blades and one of the blank walls as the hubs rotate. The intake opening of each metering device is connected to an input container containing granular product from the product tank such that the intake opening is exposed to granular product in the input container.

The present invention provides an air lock metering device operative to prevent air from leaking from the pressurized conduit on the discharge side thereof to the product input container on the intake side thereof. The metering device can dispense granular product at a range of rates that is readily controlled by adjusting the rotational speed and/or intake opening of the metering device, and is suitable for use in a variety of industries where pneumatic conveyors are used, and where granular product is metered into the pressurized conduits from a product source.

The present invention also provides a metering system metering agricultural granular product from a product tank into a plurality of pressurized distribution conduits of an air seeder. In the system the product tanks need not be pressurized, greatly simplifying the design thereof and allowing for increased flexibility of location and construction thereof The metering devices can readily be adjusted to provide the required range of dispensing rates, and can be located beside the tanks instead of under the tanks for easier access.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-5 schematically illustrate an embodiment of a metering device 1 of the present invention for metering granular product 3 into a pressurized conduit 5 of a pneumatic conveyor. The metering device 1 comprises a tubular housing 7 with a smooth inner wall surface 9, the housing 7 oriented such that a housing axis HA thereof is oriented substantially vertically. The illustrated housing 7 is cylindrical, however it is contemplated that the walls of the housing could also taper inward from one end to the other.

Figure 1:
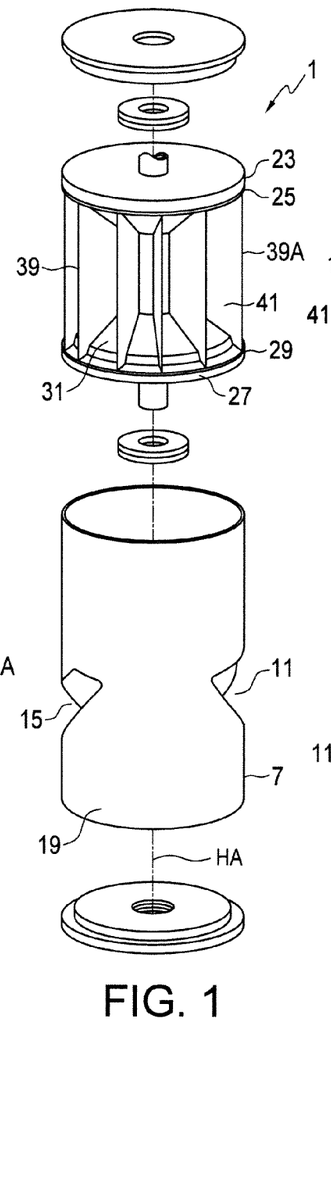
FIG. 1 is a schematic exploded perspective view of an embodiment of a metering device of the present invention for metering granular product into a pressurized conduit of a pneumatic conveyor.
Figure 1A:
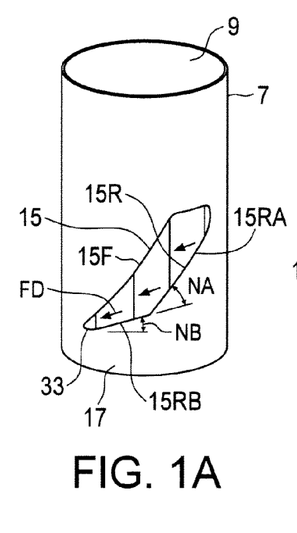
FIG. 1A is a schematic side view of the discharge side of the housing of the embodiment of FIG. 1.
Figure 1B:
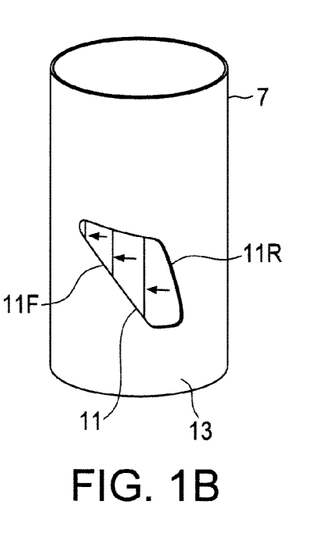
FIG. 1B is a schematic side view of the intake side of the housing of the embodiment of FIG. 1.

An intake opening 11 is defined in an intake wall 13 of the housing 7 as seen in FIG. 1B, and a discharge opening 15 is defined in a discharge wall 17 of the housing 7 opposite the intake wall 13, as seen in FIG. 1A. Blank walls 19 extend between the intake and discharge openings 11, 15. A discharge chute 21 is sealed at an input end thereof to an outer surface of the housing 7 around the discharge opening 15, and is sealed at an output end thereof to the pressurized conduit 5 through the illustrated T-connection.

An upper hub 23 is rotatably mounted in an upper end of the housing 7 above the intake and discharge openings 11, 15 and an upper seal 25 seals the perimeter of the upper hub 23 to the inner wall surface 9 of the housing 7. Retainers as required are provided. Similarly a lower hub 27 is rotatably mounted in a lower end of the housing 7 below the intake and discharge openings 11, 15, and a lower seal 29 seals the perimeter of the lower hub 27 to the inner wall surface 9 of the housing 7.

The upper surface 31 of the lower hub 27 slopes downward from in inner edge thereof adjacent to the housing axis HA to an outer edge thereof adjacent to the housing 7 such that granular product flows down the sloped upper surface 31. Granular product thus flows down the sloping upper surface 31 of the lower hub 27 and out the discharge opening 15. The forward portion 33 of the rear rim 15R of the discharge opening 15 is at or below the outer edge of the upper surface 31 of the lower hub 27 such that all granular product can slide off the sloping surface 31 and out through the discharge opening 15. The illustrated upper surface 31 of the lower hub 27 has steeper slope angles toward the outer edges thereof, helping to ensure that all product flows out the discharge opening 15.

A drive shaft 35 extends along the housing axis HA through the upper and lower hubs 23, 27 and is fastened to the upper and lower hubs 23, 27 such that the hubs rotate with the drive shaft 35. A meter drive 37 is connected to rotate the drive shaft 35 at a selected rotational speed in a forward direction FD.

Figure 1C:
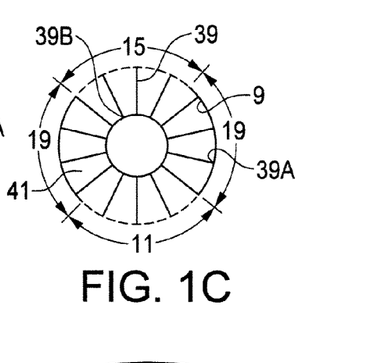
FIG. 1C is a schematic top sectional view of the embodiment of FIG. 1.

Flexible blades 39 are mounted in the housing 7. Each blade 39 extends between the upper and lower hubs 23, 27 and has an outer edge 39A wiping the inner wall surface 9 of the housing 7 as the hubs 23, 27 rotate and an inner edge 39B that is sealed to the drive shaft 35 such that a blade chamber 41 is formed between adjacent blades 39. The blade chamber 41 will be sealed when the adjacent blades 39 are wiping against one of the blank walls 19 as the hubs rotate as schematically illustrated in FIG. 1C, and then will open as the blade 39 reaches one of the openings 11, 15. FIG. 1C also shows that the discharge opening 15 extends about 90 degrees along the corresponding discharge wall 17 of the housing 7. It is contemplated that the intake and discharge openings will extend between about 80 degrees and about 100 degrees along the corresponding walls.

Figure 2:
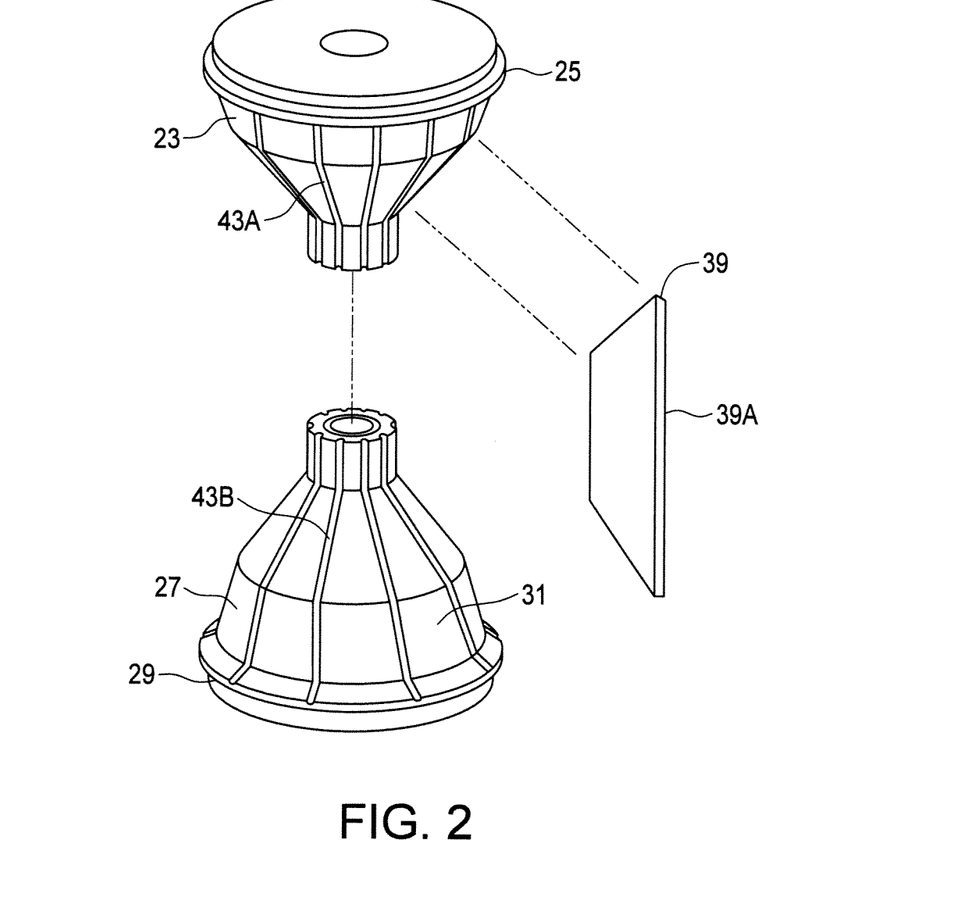
FIG. 2 is a schematic perspective view of the upper and lower hubs showing the slots therein and the blade configured to engage the slots.

In the illustrated metering device 1, the upper and lower hubs 23, 27 extend downward and upward and enclose the drive shaft 35. Upper slots 43A are defined in the upper hub 23 and extend down along the downward extending portion of the upper hub 23 and lower slots 43B are defined in the lower hub 27 and extend up along the upward extending portion of the lower hub 27. Upper, lower and inner edges of the blades 39 engage the upper and lower slots 43A, 43B with a tight fit such that the blades 39 are substantially sealed to the upper and lower hubs 23, 27, and to the drive shaft 35 enclosed inside the hubs, such that the sealed blade chamber 41 is formed. It is contemplated that other arrangements would also provide the required function, however the illustrated arrangement is convenient to make, and allows for convenient replacement of blades if required. It can be seen as well that the upper hub 23 is the same article as the lower hub 27, only inverted, such that fewer parts need to be made.

Figure 5:
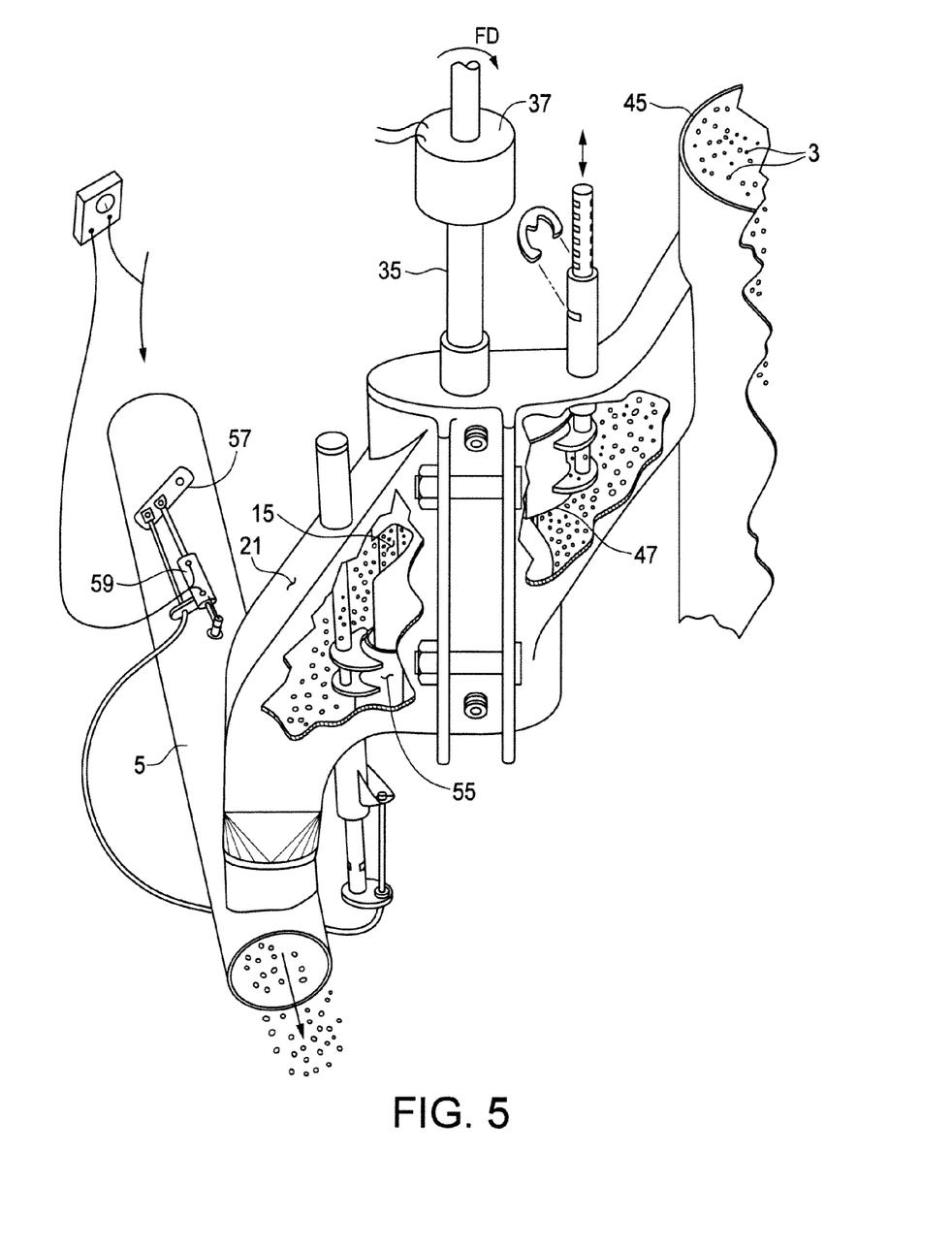
FIG. 5 is a schematic perspective sectional view of the embodiment of FIG. 1 mounted to an input container and a discharge chute.

When the intake opening 11 of the metering device 1 is connected to an input container 45 containing granular product 3, with the intake opening 11 exposed to the granular product 3 as seen in FIG. 5, the granular product 3 will flow into the housing 7 through the intake opening 11. As the hubs 23, 27 and attached blades 39 rotate in the housing 7, the blade chambers 41 fill with granular product 3 and then rotate across the blank wall 19 toward the discharge opening 15, where the granular product 3 flows out of the housing 7 through the discharge opening 15 and through the discharge chute 21 into the pressurized conduit 5.

The input container 45 is open to the atmosphere so the air pressure above the granular product is atmospheric pressure, while the air pressure in the conduit 5 is to some degree greater than atmospheric pressure depending on the operating conditions but in any event sufficiently high to generate an air stream that can carry the granular product through the conduit 5 of the pneumatic conveyor to its destination. Air is prevented from passing through the metering device 1 from the higher pressure conduit 5 to the lower atmospheric pressure in the input container 45 by the blades 39 which seal against the inner wall surface 9 of the housing 7, essentially forming an air lock between the intake and discharge openings 11, 15.

The rate of dispensing of granular product 3 is proportional to the rotational speed of the drive shaft 35, and so the dispensing rate can be readily changed within a rate range by adjusting the meter drive 37 to change that rotational speed. The rate range will depend on the flowability of the granular product being metered, since as each empty blade chamber 41 passes along the intake opening 11 a certain time will be required for the granular product to flow in and fill the chamber 41, and as each filled blade chamber 41 passes along the discharge opening 15 a certain time will be required for the granular product to flow out and empty the chamber 41. The more readily the granular product 3 flows, the less time there will be required to fill and empty the chambers.

Figure 3:
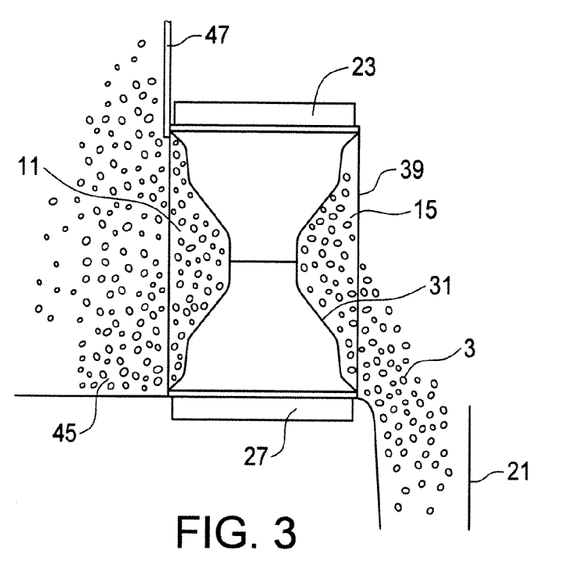
FIG. 3 is schematic sectional side view showing the intake gate in the open position.

The maximum dispensing rate in the rate range will be attained with the intake opening 11 fully exposed to the granular product 3 in the input container 45, as schematically illustrated in FIG. 3, and the rotational speed at the maximum that still allows the granular product 3 to flow into and fill the blade chambers 41 as they pass the intake opening.

Figure 3A:
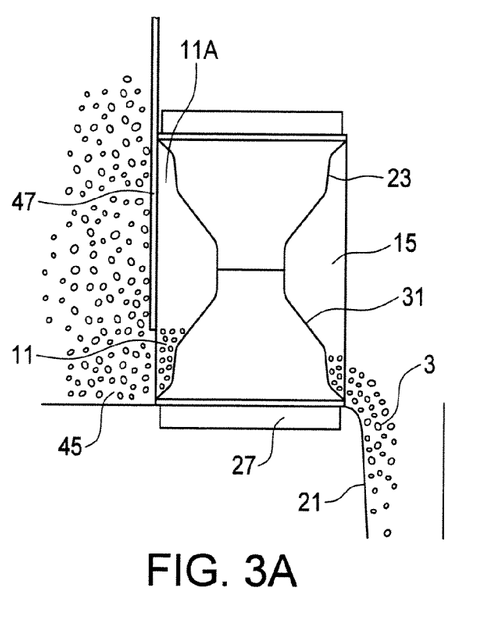
FIG. 3A is schematic sectional side view showing the intake gate in a partially closed position.
Figure 4:
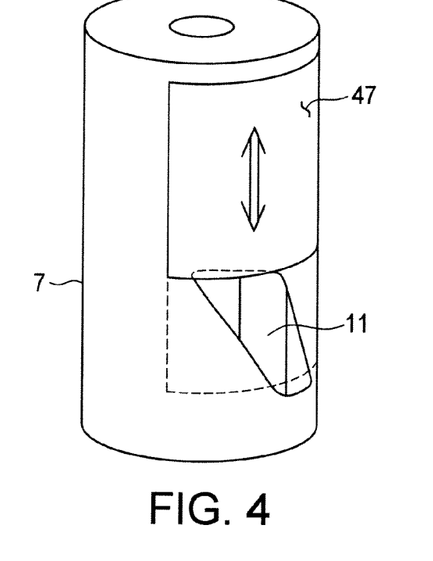
FIG. 4 is a schematic perspective view of the intake gate provided by a curved plate.

The minimum dispensing rate in the rate range will generally be dictated by the lowest speed of the drive 37 that can be conveniently attained and maintained.

Where it is desired to extend the rate range downward to provide a reduced minimum dispensing rate, an intake gate 47 can be provided that is movable to block a selected upper portion 11A of the intake opening 11 such that only a lower portion of the intake opening 11 below the gate 47 is exposed to the granular product 3 as schematically illustrated in FIG. 3A. Each blade chamber 41 then only partially fills, and the rotational speed of the drive can be increased while the rate of product being dispensed is reduced. The metering device 1 thus has a variable displacement feature whereby the amount of granular product 3 dispensed in each revolution can be reduced by moving the gate 47 down to block a greater portion of the intake opening. In the illustrated device 1 the intake gate 47 comprises a plate as schematically illustrated in FIG. 4. The illustrated plate is curved to conform to the outer surface of the housing 7 and is slidable upward and downward along the outer surface of the housing 7 from an open location where a bottom edge of the plate is above the intake opening 11 through intermediate locations such as seen in FIG. 3A, to a closed position where the bottom edge of the plate 47 is in proximity to a lower rim of the intake opening 11 as seen in FIG. 4.

The size of the housing 7 and associated parts can be scaled up or down to suit a particular application for a particular granular product and/or desired rate range. Trial and error can be used to determine dimensions, and materials used to make the device can be selected based on the granular product being metered as well.

It is generally desired to dispense a steady stream of granular product with minimal pulsing as any metering device rotates, and in the present metering device 1 pulsing is minimal. The outer edges 39A of the blades 39 wipe the inner wall surface 9 of the housing 7 in a forward direction FD. The discharge opening 15 has a rear rim 15R that slopes forward and downward from horizontal at a rear discharge angle such that as the hubs 23, 27 rotate, a top portion of each blade chamber 41 is exposed to the discharge opening 15 before a bottom portion thereof. Thus the granular product from the top of the chamber 41 begins to flow out before that in the bottom of the chamber, and the flow out through the discharge opening takes place along the entire width of the discharge opening 15 as the rear rim 15R descends. The stream of dispensed granular product is thus smooth compared to having the rear rim 15R vertical, such that the entire chamber 41 empties immediately as soon as the flowability thereof allows.

With the rear rim 15R sloping as illustrated, when rotation of the drive shaft 35 is stopped, the flow of granular product from the discharge opening 15 also stops almost immediately, since only that portion of granular product 3 remaining in any blade chamber 41 that is above the rear rim 15R will flow out once the blades 39 stop moving. Similarly, once the drive is started and the blades 39 start moving to again dispense granular product, the flow through the discharge opening 15 starts again almost immediately.

Where the rear discharge angle is configured to be substantially equal to the angle of repose of the granular product being dispensed, then stopping and starting of the product flow will be practically instantaneous, and may be achieved in an application where only a single granular product will be used. In many applications however, such as for use in an air seeder where the granular product varies significantly in size and flowability, some compromises will be required. The rear discharge angle is of course also dictated by the length of housing wall available, since a shallower angle will require a greater length of wall to descend from the top of the discharge opening 15 to the bottom thereof.

The illustrated metering device 1 is configured for a typical use dispensing agricultural granular products such as seed and fertilizer in an agricultural air seeder, where the angle of repose varies from about 35-40 degrees for some fertilizers to about 20-25 degrees for canola and mustard seed. An upper portion 15RA of the rear rim 15R of the discharge opening 15 slopes at first rear discharge angle NA that is about 45 degrees, somewhat greater than the angle of repose for most agricultural products, which means that starting and stopping will not be as quick as it might be, but will still be satisfactory for the purpose and which compromise allows the rear rim 15R to descend to the bottom as required in the limited wall length provided by about one quarter of the total perimeter of the wall of the housing 7.

A lower portion 15RB of the rear rim 15R of the discharge opening 15 slopes at second rear discharge angle NB that is about 25 degrees, which is significantly less than the first rear discharge angle NA, and that is close to the angle of repose for canola seed. Canola seed is highly flowable and so has a low angle of repose and is also dispensed at low rate. In the illustrated metering device 1 it is contemplated that only a small lower portion of each blade chamber 41, about the level of the transition between the upper and lower portions of the rear rim 15R, will contain canola seed and so starting and stopping will be almost immediate as the rotation is started and stopped.

The front rim 15F of the discharge opening 15 also slopes forward and downward from horizontal at a front discharge angle so that the outer edges 39A of the blades 39 transition smoothly back into contact with the inner wall surface 9 of the housing 7.

Similarly the rear rim 11R of the intake opening 11 slopes forward and upward from horizontal at a fairly steep rear intake angle. This rear intake angle allows the outer edges of the blades to move smoothly into the intake opening 11. Similarly the front rim 11F of the intake opening 11 slopes forward and upward from horizontal at a upward from horizontal and forward at a front intake angle. The front intake angle is shallower and less than the rear intake angle. As the outer edges 39A of the blades 39 are moving through the granular product 3 and then into contact with the front rim 11F to essentially bite off portions of granular product 3, the sloped rim reduces jamming of product and again allows the edges 39A to move more smoothly back into contact with the inner wall surface 9 of the housing 7. Sloping the rear rim 11R forward at a steeper angle reduces the length of wall required, while allowing the more shallow angle on the front rim to reduce jamming.

The metering device 1 is particularly suited for use in the pneumatic conveyor systems present in agricultural air seeders. In a typical air seeder, the bottom of each product tank slopes to a gravity discharge opening and the metering devices are typically located under that opening. The product tanks are also sealed and pressurized to a pressure corresponding to the pressure that is present in the pressurized conduits of the distribution network to prevent air flow through the metering devices.

Figure 6:
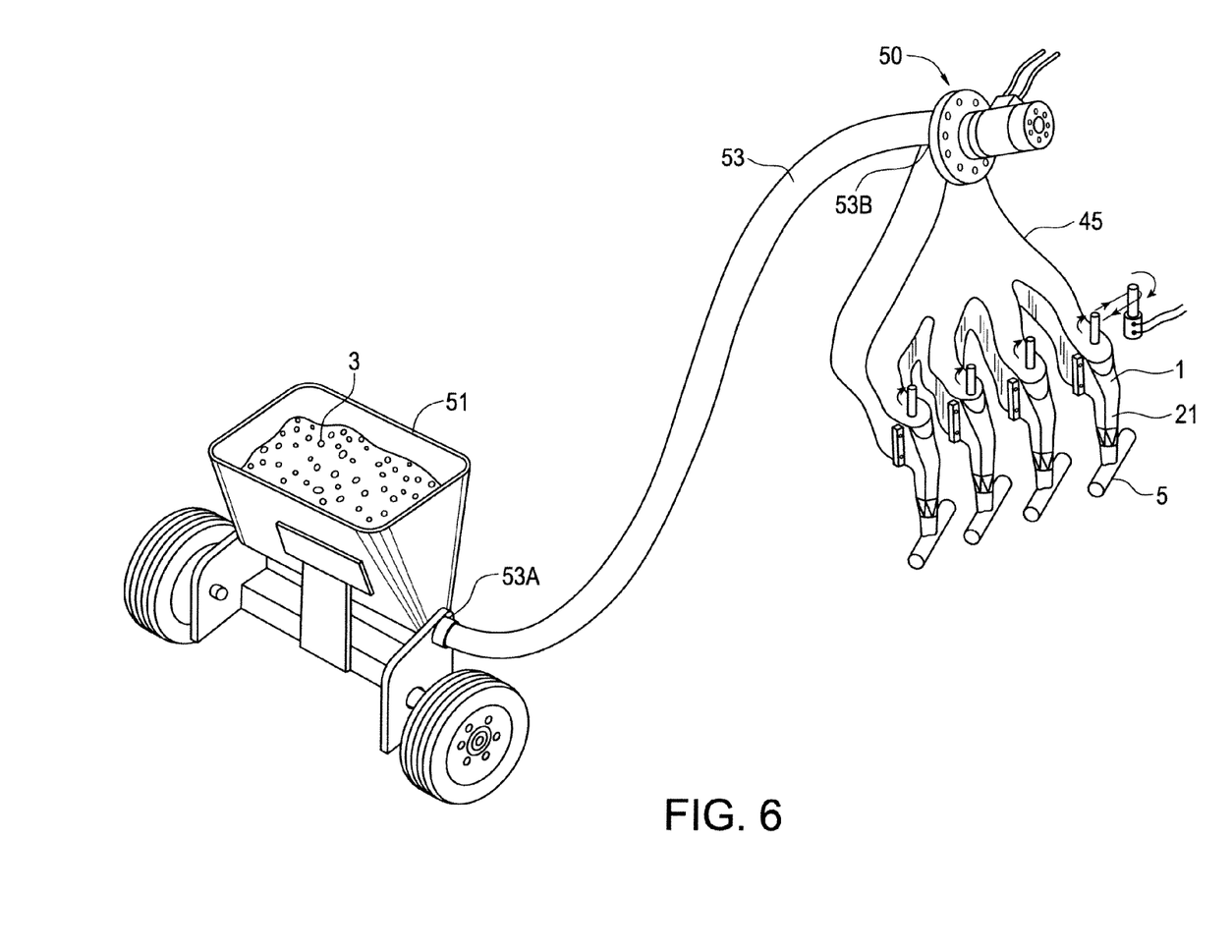
FIG. 6 is a schematic perspective view of a metering system of the present invention for metering agricultural granular product from a product tank into a plurality of pressurized distribution conduits of an air seeder using the embodiment of the metering device of FIG. 1.

FIG. 6 schematically illustrates an embodiment of a metering system 50 of the present invention for metering agricultural granular product 3 from a product tank 51 into a plurality of pressurized distribution conduits 5 of an air seeder. A metering device 1 is provided for each distribution conduit 5 with the discharge chute 21 of each metering device 1 connected to deliver granular product into the corresponding distribution conduit 5. As described above, the metering devices 1 can be adjusted to provide the wide range of dispensing rates required for air seeding applications, such as from less than three to more than 300 pounds per acre, by adjusting the rotational speed and size of the intake opening without the need to change any parts.

Using the present metering device 1, the product tanks can be open to the atmosphere and can be more easily prefabricated and assembled when air tight requirements are removed from design constraints. Larger fill openings can be provided in the tanks, or they could be open as in the illustrated product tank 51, and a removable cover similar to those found on combine grain tanks can be provided to protect the granular product from rain.

While it is contemplated that the metering devices 1 could be mounted under the product tank 51, it is typically more desirable to provide a product conveyor 53, such as a centerless auger system, to move the granular product from the product tank 51 up to a common input container 45. The product conveyor 53 has an input end 53A located under the product tank and an output end 53B oriented to discharge into the input container 45. In the system 50 of FIG. 6 the metering devices 1 are mounted side by side and the intake opening 11 of each metering device 1 is connected to the same input container 45. The product conveyor 53 is activated as required to transfer granular product 3 from the product tank 51 into the input container 45. A sensor in the input container 45 sends a demand signal to a controller to stop and start the product conveyor 53 as required to maintain the level of granular product in the input container 45 above the intake openings of the metering devices 1.

It is contemplated as well that product tanks for use with the present metering devices 1 could be modified quickly and reversibly in a way that it may be able to contain and meter out liquid contents, such as liquid fertilizer if desired.

The input end 53A of the product conveyor 53 can extend the full width of the bottom of the tank 51 such that the tank need only be sloped fore and aft, rather than also from side to side as in present tanks, thus increasing capacity and simplifying manufacture. The tank 51 can be lower, as it is not necessary to allow room for meters and drive systems, allowing for more tank volume at a lower elevation, resultant lower center of gravity with improved stability and transport ease. The lower height makes filling easier, and reduces the length of filling conveyors.

The illustrated input container 45 and metering devices 1 are shown at an elevated location, such that the air stream is not required to lift the granular product from under the product tanks up to the elevation of downstream distribution manifolds. The elevated location of the metering devices 1 also makes them easier to access for maintenance, adjustment, and the like. Each metering device 1 can be operated by a separate drive such that any one can be stopped or started to provide sectional control. As discussed above flow from the metering devices 1 starts and stops almost immediately, which is required to provide effective sectional control.

If even more immediate shut-off is desired a discharge gate 55 can be provided as schematically illustrated in FIG. 5 that can be moved upward to immediately block the discharge opening 15. An air stream throttle 57 can also be provided to adjust the volume of air flow through the corresponding pressurized conduit 5, and the discharge gate 55 and throttle 57 can be controlled by an actuator 59 such that when dispensing is stopped or started, the air stream is adjusted correspondingly.

The dispensing rates for each metering device 1 can be varied to correspond to a different number of downstream furrow openers being fed from each metering device 1. The rate can be changed by changing the rotational speed of the metering device 1, or by adjusting the position of the intake gate 47.

Figure 7:
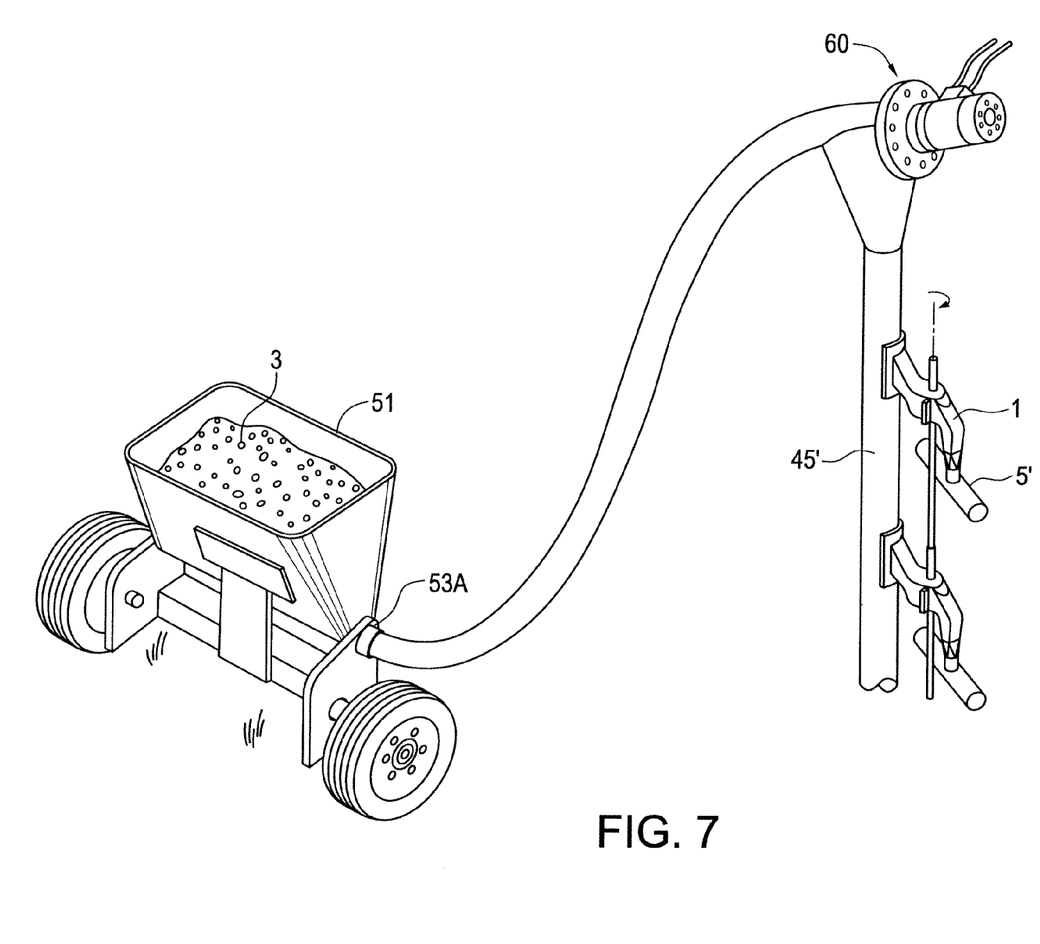
FIG. 7 is a schematic perspective view of an alternate metering system of the present invention for metering agricultural granular product from a product tank into a plurality of pressurized distribution conduits of an air seeder using the embodiment of the metering device of FIG. 1.

FIG. 7 schematically illustrates an alternate embodiment of a metering system 60 of the present invention for metering agricultural granular product 3 from a product tank 51 into a plurality of pressurized distribution conduits 5' of an air seeder. Again a like plurality of metering devices 1 is provided as in the system 50 described above, however in the system 60 the input container 45' is oriented vertically with the metering devices 1 arranged above and below each other.

The present invention thus provides an air lock metering device 1 operative to prevent air from leaking from the pressurized conduit on the discharge side thereof to the product input container on the intake side thereof. The metering device can dispense granular product at a range of rates that is readily controlled by adjusting the rotational speed and/or intake opening of the metering device, and is suitable for use in a variety of industries where pneumatic conveyors and metering devices are used.

The present invention also provides a metering system 50, 60 for metering agricultural granular product from a product tank into a plurality of pressurized distribution conduits of an air seeder. In the system the product tanks need not be pressurized, greatly simplifying the design thereof and allowing for increased flexibility of location and construction thereof. The metering devices 1 can readily be adjusted to provide the required range of dispensing rates, and can be located beside the tanks instead of under the tanks for easier access.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A metering device for metering granular product into a pressurized conduit of a pneumatic conveyor, the device comprising:
   a tubular housing with a smooth inner wall surface, the housing oriented such that a housing axis thereof is oriented substantially vertically;
   an intake opening defined in an intake wall of the housing, and a discharge opening defined in a discharge wall of the housing opposite the intake wall, and first and second blank walls between the intake and discharge openings;
   an upper hub rotatably mounted in an upper end of the housing above the intake and discharge openings, and an upper seal sealing a perimeter of the upper hub to the inner wall surface of the housing;
   a lower hub rotatably mounted in a lower end of the housing below the intake and discharge openings, and a lower seal sealing a perimeter of the lower hub to the inner wall surface of the housing, wherein an upper surface of the lower hub slopes downward from in inner edge thereof adjacent to the housing axis to an outer edge thereof adjacent to the housing such that granular product flows down the sloped upper surface;
   a drive shaft extending along the housing axis through the upper and lower hubs and fastened to the upper and lower hubs such that the hubs rotate with the drive shaft;
   a meter drive connected to rotate the drive shaft at a selected rotational speed;
   a plurality of flexible blades, each blade extending between the upper and lower hubs and having an outer edge wiping the inner wall surface of the housing as the hubs rotate and an inner edge substantially sealed to the drive shaft such that a substantially sealed blade chamber is formed between adjacent blades and one of the blank walls as the hubs rotate.

2. The device of claim 1 further comprising a discharge chute sealed at an input end thereof to an outer surface of the housing around the discharge opening, and adapted to be sealed at an output end thereof to a pressurized conduit of the pneumatic conveyor.

3. The device of claim 1 further comprising an input container containing granular product connected to the intake opening such that the intake opening is exposed to the granular product.

4. The device of claim 3 further comprising an intake gate movable to block a selected upper portion of the intake opening such that only a lower portion of the intake opening below the gate is open and exposed to the granular product.

5. The device of claim 4 wherein the intake gate comprises a plate slidable upward and downward along an outer surface of the housing from an open location where a bottom edge of the plate is above the intake opening, to a closed position where the bottom edge of the plate is in proximity to a lower rim of the intake opening.

6. The device of claim 1 wherein the outer edges of the blades wipe the inner wall surface of the housing in a forward direction, and wherein the discharge opening has a rear rim that slopes forward and downward from horizontal at a rear discharge angle such that as the hubs rotate, a top portion of each blade chamber is exposed to the discharge opening before a bottom portion thereof.

7. The device of claim 6 wherein a front rim of the discharge opening slopes forward and downward from horizontal at a front discharge angle.

8. The device of claim 6 wherein an upper portion of the rear rim of the discharge opening slopes at first rear discharge angle and a lower portion of the rear rim of the discharge opening slopes at second rear discharge angle that is less than the first rear discharge angle.

9. The device of claim 1 wherein the outer edges of the blades wipe the inner wall surface of the housing in a forward direction, and wherein a rear rim of the intake opening slopes forward and upward from horizontal at a rear intake angle.

10. The device of claim 9 wherein a front rim of the intake opening slopes forward and upward from horizontal at a front intake angle that is less than the rear intake angle.

11. The device of claim 1 the discharge opening extends between about 80 degrees and about 100 degrees along the corresponding discharge wall of the housing.

12. The device of claim 1 wherein the upper and lower hubs enclose the drive shaft and define corresponding upper and lower slots, and wherein upper, lower and inner edges of the blades engage the upper and lower slots.

13. A metering system for metering agricultural granular product from a product tank into a plurality of pressurized distribution conduits of an air seeder, the system comprising:
for each distribution conduit, a metering device comprising:
a tubular housing with a smooth inner wall surface, the housing oriented such that a housing axis thereof is oriented substantially vertically;
an intake opening defined in an intake wall of the housing, and a discharge opening defined in a discharge wall of the housing opposite the intake wall, and first and second blank walls between the intake and discharge openings;
a discharge chute sealed at an input end thereof to an outer surface of the housing around the discharge opening, and sealed at an output end thereof to a corresponding distribution conduit;
an intake gate movable to block a selected upper portion of the intake opening such that only a lower portion of the intake opening below the gate is open and exposed to the granular product;
an upper hub rotatably mounted in an upper end of the housing above the intake and discharge openings, and an upper seal sealing a perimeter of the upper hub to an inner wall surface of the housing;
a lower hub rotatably mounted in a lower end of the housing below the intake and discharge openings, and a lower seal sealing a perimeter of the lower hub to the inner wall surface of the housing, wherein an upper surface of the lower hub slopes downward from in inner edge thereof adjacent to the housing axis to an outer edge thereof adjacent to the housing such that granular product flows down the sloped upper surface;
a drive shaft extending downward along the housing axis through the upper and lower hubs and fastened to the upper and lower hubs such that the hubs rotate with the drive shaft;
a meter drive connected to rotate the drive shaft at a selected rotational speed;
a plurality of flexible blades, each blade extending between the upper and lower hubs and having an outer edge wiping the inner wall surface of the housing as the hubs rotate and an inner edge substantially sealed to the drive shaft such that a substantially sealed blade chamber is formed between adjacent blades and one of the blank walls as the hubs rotate;
wherein the intake opening of each metering device is connected to an input container containing granular product from the product tank such that the intake opening is exposed to granular product in the input container.

14. The system of claim 13 wherein the intake gate comprises a plate slidable upward and downward along an outer surface of the housing from an open location where a bottom edge of the plate is above the intake opening, to a closed position where the bottom edge of the plate is in proximity to a lower rim of the intake opening.

15. The system of claim 13 wherein the outer edges of the blades wipe the inner wall surface of the housing in a forward direction, and wherein the discharge opening has a rear rim that slopes forward and downward from horizontal at a rear discharge angle such that as the hubs rotate, a top portion of each blade chamber is exposed to the discharge opening before a bottom portion thereof.

16. The system of claim 15 wherein a front rim of the discharge opening slopes forward and downward from horizontal at a front discharge angle.

17. The system of claim 15 wherein an upper portion of the rear rim of the discharge opening slopes at first rear discharge angle and a lower portion of the rear rim of the discharge opening slopes at second rear discharge angle that is less than the first rear discharge angle.

18. The system of claim 13 wherein the outer edges of the blades wipe the inner wall surface of the housing in a forward direction, and wherein a rear rim of the intake opening slopes forward and upward from horizontal at a rear intake angle.

19. The system of claim 18 wherein a front rim of the intake opening slopes forward and upward from horizontal at a upward from horizontal and forward at a front intake angle that is less than the rear intake angle.

20. The system of claim 13 comprising a product conveyor with an input end located under the product tank and an output end oriented to discharge into the input container, wherein the product conveyor is activated as required to transfer granular product from the product tank into the input container and maintain a desired level of granular product in the input container.

21. The apparatus of claim 20 wherein a first metering device is located beside a second metering device.

22. The apparatus of claim 20 wherein a first metering device is located above a second metering device.

23. The system of claim 13 further comprising a discharge gate movable to block at least a lower portion of the discharge opening.

24. The system of claim 13 the discharge opening extends between about 80 degrees and about 100 degrees along the corresponding discharge wall of the housing.

* * * * *